United States Patent
Leuthner

(10) Patent No.: US 11,271,418 B2
(45) Date of Patent: Mar. 8, 2022

(54) CHARGING METHOD THAT REDUCES AGING OF ELECTRICAL ENERGY STORE OF A VEHICLE

(71) Applicant: Robert Bosch GmbH, Stuttgart (DE)

(72) Inventor: Stephan Leuthner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 16/690,760

(22) Filed: Nov. 21, 2019

(65) Prior Publication Data
US 2020/0169104 A1 May 28, 2020

(30) Foreign Application Priority Data
Nov. 22, 2018 (DE) ............. 10 2018 219 977.9

(51) Int. Cl.
*H02J 7/00* (2006.01)
*B60L 53/66* (2019.01)
*B60L 53/30* (2019.01)
*H02J 7/14* (2006.01)

(52) U.S. Cl.
CPC .......... *H02J 7/0091* (2013.01); *B60L 53/305* (2019.02); *B60L 53/66* (2019.02); *H02J 7/0063* (2013.01); *H02J 7/14* (2013.01); *H02J 2007/0067* (2013.01)

(58) Field of Classification Search
CPC .................................................. H02J 7/0091
USPC ........................................................ 320/109
See application file for complete search history.

(56) References Cited

U.S. PATENT DOCUMENTS

| 2011/0078092 A1* | 3/2011 | Kim | B60L 53/65 705/412 |
| 2014/0217976 A1* | 8/2014 | McGrath | B60L 53/54 320/109 |
| 2015/0329003 A1* | 11/2015 | Li | B60L 53/66 320/134 |
| 2016/0101705 A1* | 4/2016 | Kuraishi | G06Q 10/06 320/109 |

FOREIGN PATENT DOCUMENTS

DE    102012209645 A1    12/2013

* cited by examiner

*Primary Examiner* — Yalkew Fantu
(74) *Attorney, Agent, or Firm* — Michael Best & Friedrich LLP

(57) ABSTRACT

A charging method (100) for an electrical energy store (22) of a motor vehicle (20) is disclosed, including the steps of:
  detecting (110) the current charge state of the electrical energy store (22),
  detecting (120) the planned scope of use of the motor vehicle (20),
  ascertaining (130) the ambient temperatures present during the planned use,
  ascertaining (140) a target charge state of the electrical energy store as a function of the maximum possible charge state and the detected ambient temperature,
  producing (150) a signal as a function of the ascertained target charge state and
  transmitting the produced signal to the charging current regulator (28, 48) and/or an output means (17).

16 Claims, 2 Drawing Sheets

CHARGING METHOD THAT REDUCES AGING OF ELECTRICAL ENERGY STORE OF A VEHICLE

BACKGROUND OF THE INVENTION

The invention relates to a charging method for an electrical energy store of a motor vehicle, an input system embodied to carry out the charging method, and a system comprising a motor vehicle, a charging station and the input system.

These days, batteries of electric vehicles are usually charged overnight. The batteries are usually only partly discharged or else hardly ever completely discharged. Usually, the battery of an electric vehicle is charged as soon as the vehicle is parked and a charging option is present. Then, this is also referred to as the so-called "always charging" (AC) model.

A further option for charging a battery of an electric vehicle can be implemented on the basis of the current energy prices. Here, this is referred to as a "threshold-based rule" (TBR) model. To this end, the electric vehicle must be connected to the charging station at all times. Information in relation to the charge state of the battery and the energy prices are provided centrally (cloud-based solution).

SUMMARY OF THE INVENTION

The charging method according to the invention, which includes the steps listed below, has the advantage of a reduced aging of the electrical energy store.

In one method step, the current charge state of the electrical energy store, in particular of the accumulator, is detected. The electrical energy store stores the electrical energy on an electrochemical basis.

In one method step, the planned scope of use of the motor vehicle is detected.

In one method step, the ambient temperatures prevalent during the planned use, in particular at the planned use location and/or at the planned use time, are ascertained.

In one method step, a target charge state of the electrical energy store is ascertained as a function of the maximum possible charge state and the detected ambient temperature. In particular, the target charge state reduces with increasing ambient temperature.

In one method step, a signal is produced as a function of the ascertained target charge state and the produced signal is transmitted to a charging current regulator and/or an output means. In particular, the charging current regulator is part of the motor vehicle or the charging station.

It is advantageous that the energy store is charged independently of the provision of a charging current but dependent on factors influencing the aging, such as the ambient temperature, the use of the motor vehicle, the charging current and/or discharging current and the charge state.

Advantageous developments and improvements of the method specified in the main claim arise from the measures listed in the dependent claims.

One possible development lies in ascertaining the ambient temperature at the planned use location at the planned use time. This allows a best-possible prevention of the unwanted aging of the energy store. Preferably, such a procedure may likewise cover possible problems when changing the use location with a temperature difference.

Ascertaining the ambient temperature by means of forecasting services should be considered to be an advantageous development. Accordingly, ambient temperatures for the planned use location and the planned use time are queried, for example by way of an Internet connection.

In one development, the ambient temperature comprises not only a single temperature value but a multiplicity of temperature values corresponding to the multiplicity of use locations and/or the progress of the use. Therefore, the ambient temperature value is embodied as an array, in particular, said array being included in the calculation of the target charge state.

A possible development is distinguished in that the signal is a charging control signal. The charging control signal is made available to the charging current regulator. In particular, the charging current regulator is part of the motor vehicle and/or part of the charging station. The charging current regulator regulates the level of the charging current that is used to charge the electrical energy store.

An advantageous development of the method comprises the following optional method claims.

In one method step, the electrical energy store is charged until the target charge state is reached. In particular, charging is implemented by means of the charging current from the charging station or from the charging current regulator. The charging current regulator sets a charging current in accordance with the target charge state and the current charge state, said charging current being made available to the energy store.

In one method step, the duration for charging the electrical energy store to the maximum possible charge state proceeding from the target charge state is ascertained.

In a further method step, the control signal is produced in such a way that the energy store has substantially reached the target charge state just before or at the planned use.

The advantages arising here are that the region just below the maximum possible charge state, which is inexpedient in respect of aging, is only present for a brief time, in particular just before the motor vehicle is used.

One advantageous development is that the scope of use comprises, in particular, the expected mode or modes of driving and/or the height profile or profiles to be expected and/or the presence or absence of the user and/or the route profile or profiles. As a result thereof, the target charge state can be calculated even better and more accurately.

One possible development is that the lowest charge state is ascertained as a function of the planned use and the ascertained ambient temperatures. The ascertained lowest permissible charge state is included in the ascertainment of the target charge state.

One development is that the self-discharge rate is detected. The target charge state is ascertained as a function of the self-discharge rate. The self-discharge rate is the rate at which the energy store discharges itself.

Further, the invention relates to an input system. The input system is embodied to carry out the charging method. Preferably, the input system is embodied to carry out the essential method steps of the charging method. To this end, the input system advantageously comprises a communication means for communicating with the motor vehicle and/or the charging station and/or third device, such as forecasting services, for example. Moreover, said input system comprises input means for detecting the scope of use.

In particular, the input means can be embodied as a pushbutton, a switch, a keyboard, as touch elements and/or by means of a speech input system.

It comprises a processing unit that is embodied to carry out some method steps, more particularly all method steps. It comprises an output means that is embodied to output the produced signal. Furthermore, the output means is embodied such that, in particular, it can transmit the produced signal to a charging current regulator, the motor vehicle and/or the charging station.

One possible development is that the input system is part of the motor vehicle, more particularly securely installed in the motor vehicle. In particular, the input system is part of the navigation system, or the one input system is formed by the navigation system.

According to a further particularly advantageous development, the input system is usable on the move. The input system is embodied in such a way that it can carry out all steps of the method. Preferably, the input system is embodied as a smartphone, tablet, computer or smartwatch.

One development is that a computer program is embodied in such a way that it can carry out all the steps of the method. In particular, the computer program is executed on an input system, for example on a smartphone, a tablet, a computer or a smartwatch, a navigation system, a multimedia system.

One possible development is that a machine-readable storage medium is embodied in such a way that the computer program is stored thereon.

Further, the invention relates to a system comprising a motor vehicle, a charging station and an input system. The system is embodied to carry out the method. The charging station is embodied to make current available to the motor vehicle for the purposes of charging the electrical energy store. In particular, the charging current is regulated by the charging current regulator. The charging current regulator is part of the charging station or of the motor vehicle.

Advantageously, a detection means is provided, which is embodied to detect the losses when charging the energy store. In particular, such losses may arise from the cooling and the cooling devices of the motor vehicle connected therewith. As a function of the losses detected by the detection means, the charging current regulator adapts the charging current in such a way that the electrical energy store is charged to the target charge state at the desired time of use.

BRIEF DESCRIPTION OF THE DRAWINGS

Further features of the invention arise from the figures and are explained in more detail in the following description. In detail.

DETAILED DESCRIPTION

Figure 1:
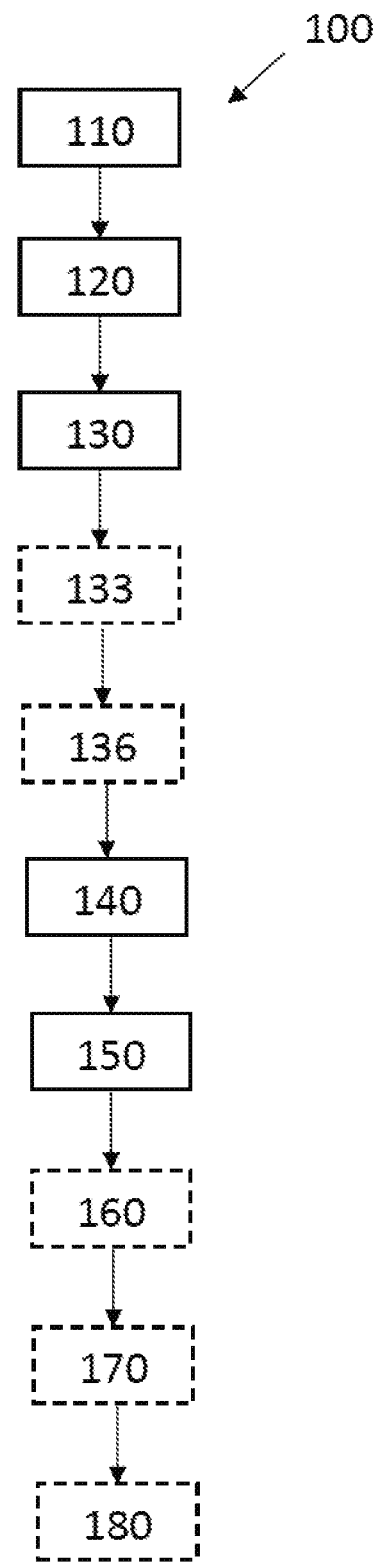
FIG. 1 shows a flowchart of the method according to the invention.
Figure 2:
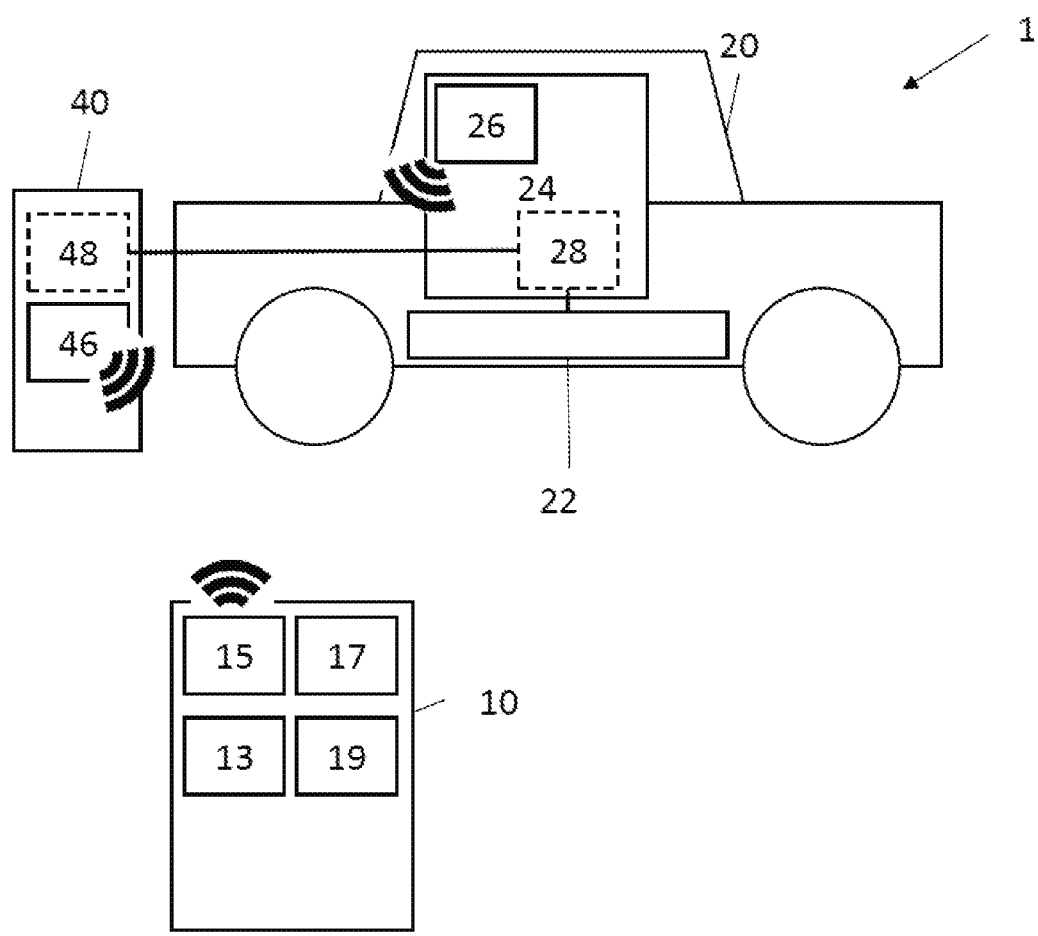
FIG. 2 shows a system according to the invention with an input system according to the invention.

FIG. 1 illustrates a flowchart of the method 100 according to the invention. The method 100 comprises a plurality of method steps, the sequence of which can be interchanged in relation to the arrangement in FIG. 1. A system 1 according to the invention with an input system 10 according to the invention is illustrated in FIG. 2.

The current charge state of the electrical energy store 22, which is embodied as an accumulator, in particular, is detected in a method step 110. Here, the detection 110 can be implemented directly by means of a sensor. As an alternative or in addition thereto, a sensor can detect the value and provide the value by means of an energy storage management system and/or a communications link. The charge state can be queried, more particularly detected, by means of a query of the sensor or the management system by way of a communications link.

The method 100 is carried out at least in part on a processing unit 13 of an input system 10. The processing unit 13 comprises a communication means 26, which can transmit corresponding queries and which can receive the charge state as response.

In particular, the electrical energy store 22 is embodied as a secondary battery, preferably as an accumulator. The electrical energy store 22 is a rechargeable store for electrical energy, on an electrochemical basis. In particular, the electrical energy store comprises lithium.

The planned scope of use of the motor vehicle 20 is detected in a further method step 120. In particular, the scope of use comprises the expected mode of driving and/or the expected height profile during the drive and/or the presence or absence of the user and/or the route profile. Further, the expected scope of use comprises, in particular, how, when, where and/or for how long the motor vehicle is intended to be used.

The expected mode of driving comprises, in particular, how the user drives with their vehicle, in particular in respect of speed, acceleration and braking. By way of example, the target charge state over the same distance can be lower in the case of an economical driver when compared with a non-economical driver. Further, a fast mode of driving means a higher power consumption than a measured mode of driving.

In particular, the expected route can be detected by means of a query to an input system.

In particular, the input system 10 can be embodied as a mobile appliance, preferably as a smartphone, tablet, notebook, smartwatch. However, it may also be part of the motor vehicle. In particular, it can be integrated into the HMI system, in particular into the navigation system of the motor vehicle. The input system can be formed by the HMI system.

The expected route has effects on the energy requirements; in particular, a motor vehicle 20 only driving downhill requires less energy than a motor vehicle 20 driving uphill. A high recuperation energy, for example after the drive has commenced, will be included in the ascertainment of the target charge state. By way of example, if the user lives up a hill and initially drives into the valley according to their route, the recuperation energy arising during the drive into the valley can be used for further charging of the energy store 22. The target charge state when charging with the charging station can be assumed to be correspondingly lower.

The expected presence and/or absence of the user is preferably part of the planned scope of use. By way of example, an absent user does not require a motor vehicle 10 with a fully charged energy store 22. In particular, there can be a comparison with an appointment diary of the user in this case.

The ambient temperature is ascertained in a further method step 130. Preferably, the ambient temperature is ascertained at the planned use location and at the planned time of use. In particular, the ascertainment is implemented by means of temperature sensors and/or forecasting methods. As an alternative or in addition thereto, the ambient temperature can be ascertained by means of forecasting services. Forecasting services can be weather services, for example, which provide the predicted weather over the Internet. The ascertained ambient temperature can be embodied as an array comprising a multiplicity of ambient temperature values. The ambient temperature values correspond to the predicted temperature values at the individual use locations of the motor vehicle.

A target charge state of the energy store 22 as a function of the maximum possible charge state is ascertained in a further method step 140. The maximum possible charge state corresponds to a charge of 100% of the electrical energy store. The maximum possible charge state corresponds to the currently possible maximum charge state, including the effects of aging. The maximum energy that can be stored by an energy store reduces due to aging. The maximum current charge state is 100%; it can be reduced in relation to the original maximum charge state, in particular likewise due to aging considerations.

Further, the detected ambient temperature is included in the ascertainment of the target charge state. This reduces the effect of aging on the electrical energy store. By way of example, if the ambient temperature exceeds 30° C. for several days, the target charge state is restricted to, e.g., 80% of the maximum possible charge state.

A signal is produced in a further method step 150. The signal is produced as a function of the ascertained target charge state. The signal is embodied in such a way that it can be transmitted to the motor vehicle 20 and/or the charging station 40 by means of a communication means 15. The signal is transmitted to the motor vehicle 20 and/or the charging station. Preferably, the signal is transmitted to the charging current regulator 28 of the motor vehicle 20 and/or the charging current regulator 48 of the charging station 20.

As an alternative or in addition thereto, the signal is produced in such a way that it produces an output on the output means 17 of the input system 10. In particular, it causes the output means 17 to output the ascertained target charge state as a suggestion, in particular for verification by the user. The output means 17 can be, in particular, an indication means, preferably a display, and/or an acoustic output means, preferably a loudspeaker.

The electrical energy store 22 is charged until the target charge state is reached in an optional method step 160. Preferably, the optional method step 160 is performed by the charging station 40 itself or the charging current regulator or regulators 28, 48 of the motor vehicle. Preferably, the method step 160 is performed by the charging current regulator 28, 48. To this end, the charging station 40 makes a charging current available. The level of the charging current is oriented to the type of energy store 22, the energy provided by the power grid, the target charge state and the current charge state.

The duration for charging the electrical energy store 22 to the maximum possible charge state proceeding from the target charge state is ascertained in a further optional method step 170. The energy store 22 of the motor vehicle 20 can be charged to the target charge state that is optimal for the energy store 22 in respect of the symptoms of aging. However, if the maximum energy storage capacity is required, the remaining charge can be charged just before use by the user. To this end, it is necessary to know how long it takes to charge the electrical energy store to the maximum charge proceeding from the target charge state.

In a further optional method step 180, a control signal is produced in such a way that the energy store substantially reaches the maximum possible state just before or at the planned use.

In an optional method step 133, the lowest permissible charge state is additionally ascertained as a function of the state of the energy store. The target charge state is ascertained as a function of the scope of use and the ambient temperature and the ascertained lowest permissible charge state. By way of example, if the lowest charge state is 20% of the maximum charge and the optimal target charge state would be 80% but a charge of 90% is required, the target charge state could be raised to 90%. Alternatively, the lowest charge state could be reduced to 15% and the target charge state could be increased to 85%.

The self-discharge rate is detected in a further optional method step 136. The target charge state is ascertained as a function of the self-discharge rate. The self-discharge rate depends both on the electrochemical system and on the structure or embodiment of the energy store.

FIG. 2 illustrates a system 1. The system comprises an input system 10, a motor vehicle 20 and a charging station 40.

The input system 10 is embodied and configured in such a way that it can carry out the method 100. The input system 10 comprises a communication means 15. The communication means 15 facilitates communicating with the charging station 40 and/or the motor vehicle 20, in particular with the charging current regulator 20, 28, in particular by means of wireless or wired communication. In particular, the communication is implemented by means of LTE, UMTS, 3G, 5G, 6G, WLAN, Bluetooth, etc. The motor vehicle 20 comprises a communication means 26. The charging station 40 comprises a communication means 46.

Moreover, the input system 10 comprises an output means 17. In particular, the output means 17 can be embodied as an indication means, preferably as a display, and/or as an acoustic output means, preferably as a loudspeaker.

Moreover, the input system 10 comprises a processing unit 13 that, in particular, is embodied to carry out at least individual method steps. Additionally, the input system 10 optionally comprises a temperature sensor that is able to detect the temperature of the surroundings. As an alternative or in addition thereto, the input system 10, by means of its communication means 15, can establish a communications link to an external third appliance and can query from the latter the ambient temperature at a certain time or a plurality of certain times at one or more certain locations. In particular, it queries the ambient temperature at the locations and at the times at which the vehicle is present there.

Furthermore, the input system 10 comprises an input means 19. The input means 19 is embodied in such a way that it facilitates the detection of the planned use behavior by the user.

The motor vehicle 20 comprises the electrical energy store 22.

The energy store 22 makes the power available for the drive system of the motor vehicle 20. Preferably, this relates to a hybrid or electrically operated motor vehicle 20.

Moreover, the motor vehicle 20 comprises a processing unit 24 that is embodied in such a way that it can process individual method steps. Preferably, the method step 110 is implemented, in particular in part, by the processing unit 24. Additionally, should a charging regulator 28 be provided in the motor vehicle, the latter is part of the processing unit, in particular.

The processing unit 24 comprises sensors that can detect the charge state of the energy store 22. A communication means 26, which is likewise part of the vehicle 20, facilitates communication with the charging station 40 and/or the input system 10.

According to one development of the invention, the input system 10 is securely installed in the motor vehicle 20. Preferably, the communication between the communication means 15 of the input system 10 and the communication means 26 of the processing unit 24 is implemented by means of a wired connection, in particular by means of a CAN, LIN or MOST bus.

The charging station 40 comprises the charging controller 48. The charging controller 48 monitors the power provided to the motor vehicle 20.

Moreover, the charging controller 48 regulates the current provided by the power operator. The charging controller 48 regulates the electric current as a charging current in such a way that the target charge state is reached in the energy store 22. Preferably, the charging current is regulated in such a way in the process that the target charge state is reached at a desired time.

Consequently, the charging current is regulated in such a way that the target charge state is reached just before or at the time of the desired use.

Moreover, a detection means is provided, which ascertains the loss during charging, in particular for cooling the energy store 22. By way of example, the energy store 22 must be cooled during charging. Cooling requires power. This power should be considered to be a loss. Some of the charging power is used for cooling purposes. In particular, the detection means can be formed in the motor vehicle 20 or in the charging station 40. The charging current of the charging station 40 is set as a function of the detected loss. The target charge state is reached despite the losses.

If a smart grid function is possible, the target charge state of the battery can be adapted if, for example, the ambient conditions, more particularly the ambient temperature, or the expected use changes. Here, discharging the energy store is also possible in the addition to the function of charging the energy store.

If, additionally, a fleet of a plurality of electric vehicles is operated, the operation can be adapted in such a way that the energy store of the individual vehicles is, on average, exposed to the same load by virtue of the vehicles, on average, being exposed to uniform loads when the use is taken into account, in particular the mode of driving.

The operating state of the electrical energy store can be detected by way of the input system 10; the planned route can be ascertained by way of the input system.

According to one development of the invention, the planned scope of use is gathered from the appointment diary.

The invention claimed is:

1. A charging method for an electrical energy store of a motor vehicle, the method comprising:
   detecting a current charge state of the electrical energy store,
   detecting a planned scope of use of the motor vehicle,
   ascertaining ambient temperatures present during the planned scope of use,
   ascertaining a target charge state of the electrical energy store as a function of a maximum possible charge state, the planned scope of use, and the ascertained ambient temperatures during the planned scope of use,
   producing a signal as a function of the ascertained target charge state, and
   transmitting the produced signal to a charging current regulator, to an output means, or both,
   wherein detecting the planned scope of use of the motor vehicle includes ascertaining planned use locations and planned use times, and wherein ascertaining the ambient temperatures present during the planned scope of use includes ascertaining the ambient temperatures at the planned use locations and at the planned use times.

2. The charging method according to claim 1, further comprising:
   charging the electrical energy store until the target charge state is reached,
   ascertaining the duration for charging the electrical energy store to the maximum possible charge state proceeding from the target charge state,
   producing a control signal that causes the target charge state to be reached before or at the planned use of the electrical energy store.

3. The charging method according to claim 1, wherein the planned scope of use further comprises an expected height profile, a presence or absence of the user, and a route profile.

4. The charging method according to claim 3, wherein the route profile is provided from a diary of the user.

5. The charging method according to claim 1, further comprising:
   ascertaining the lowest permissible charge state as a function of the planned use and the ascertained ambient temperatures.

6. The charging method according to claim 1, wherein the self-discharge rate is detected and in that the target charge state is ascertained as a function of the self-discharge rate.

7. The charging method according to claim 1, wherein the ambient temperatures comprise a multiplicity of temperature values corresponding to the multiplicity of planned use locations and the planned use times.

8. An input system comprising:
   a communication means for communicating with a motor vehicle, a charging station, or both,
   an input means for receiving inputs directed to a planned scope of use, and
   a processing unit configured to
   detect a current charge state of an electrical energy store,
   detect the planned scope of use of the motor vehicle,
   ascertain ambient temperatures present during the planned scope of use,
   ascertain a target charge state of the electrical energy store as a function of a maximum possible charge state, the planned scope of use, and the ascertained ambient temperatures,
   produce a signal as a function of the ascertained target charge state, and
   transmit the produced signal to a charging current regulator, to an output means, or both,
   wherein detecting the planned scope of use of the motor vehicle includes ascertaining planned use locations and planned use times, and wherein ascertaining the ambient temperatures present during the planned scope of use includes ascertaining the ambient temperatures at the planned use locations and at the planned use times.

9. The input system according to claim 8, wherein the input system is securely installed in the motor vehicle.

10. The input system according to claim 8, wherein the input system is employable on the move.

11. A system, comprising a motor vehicle, a charging station and an input system according to claim 8, wherein the charging station provides the motor vehicle with a charging current for charging the electrical energy store.

12. The system according to claim 11, wherein a detection means is configured to detect losses during the charging of the electrical energy store, and wherein, despite the losses, the charging station is configured to reach the target charge state by way of adapting the charging current.

13. The input system according to claim 8, wherein the ambient temperatures comprise a multiplicity of temperature values corresponding to the multiplicity of planned use locations and the planned use times.

14. A non-transitory computer-readable storage medium containing instructions which when executed by a computer cause the computer to detect a current charge state of an electrical energy store,
detect a planned scope of use of a motor vehicle,
ascertain ambient temperatures present during the planned scope of use,
ascertain a target charge state of the electrical energy store as a function of the maximum possible charge state, the planned scope of use, and the ascertained ambient temperatures during the planned scope of use,
produce a signal as a function of the ascertained target charge state, and
transmit the produced signal to a charging current regulator, to an output means, or both,
wherein the instructions executed by the computer cause the computer to detect the planned scope of use of the motor vehicle including ascertaining planned use locations and planned use times, and wherein ascertaining the ambient temperatures present during the planned scope of use includes ascertaining the ambient temperatures at the planned use locations and at the planned use times.

15. The non-transitory computer-readable storage medium containing instructions according to claim 14, wherein the ambient temperatures comprise a multiplicity of temperature values corresponding to the multiplicity of planned use locations and the planned use times.

16. A charging method for an electrical energy store of a motor vehicle, the method comprising:
  detecting a current charge state of the electrical energy store,
  detecting a planned scope of use of the motor vehicle,
  ascertaining ambient temperatures present during the planned scope of use,
  ascertaining a target charge state of the electrical energy store as a function of a maximum possible charge state, the planned scope of use, and the ascertained ambient temperatures during the planned scope of use,
  producing a signal as a function of the ascertained target charge state, and
  transmitting the produced signal to a charging current regulator, to an output means, or both,
  wherein the charging method includes a detection means provided to detect losses when charging the energy store from cooling and the cooling devices of the vehicle connected therewith, and wherein the charging current regulator adapts the charging current in such a way that the electrical energy store is charged to the target charge state at the desired time of use.

* * * * *